United States Patent [19]
Poremba et al.

[11] Patent Number: 5,903,698
[45] Date of Patent: May 11, 1999

[54] FIBER OPTIC CONNECTION ASSEMBLY

[75] Inventors: John Poremba, San Jose; Jack E. Patterson, La Selva Beach, both of Calif.

[73] Assignee: Wiltron Company, Morgan Hill, Calif.

[21] Appl. No.: 08/837,267

[22] Filed: Apr. 11, 1997

[51] Int. Cl.[6] .................................................. G02B 6/42
[52] U.S. Cl. ............................................................ 385/135
[58] Field of Search .................................... 385/134, 135; 356/73.1

[56] References Cited

U.S. PATENT DOCUMENTS

| | | | |
|---|---|---|---|
| 4,289,398 | 9/1981 | Robichaud | 356/73.1 |
| 4,875,772 | 10/1989 | Gentile | 356/73.1 |
| 4,898,448 | 2/1990 | Cooper | 385/135 |
| 5,137,351 | 8/1992 | So | 356/73.1 |
| 5,363,467 | 11/1994 | Keith | 385/135 |

*Primary Examiner*—John D. Lee
*Assistant Examiner*—Ellen E. Kang
*Attorney, Agent, or Firm*—Fliesler, Dubb, Meyer & Lovejoy LLP

[57] ABSTRACT

A connector assembly for optical fiber cables which provides an increased density of optical fiber connections in a confined space. The assembly includes a front panel defining a first plane; and a connection panel having a face defining a plane having an angle with respect to the first plane.

15 Claims, 2 Drawing Sheets

5,903,698

FIBER OPTIC CONNECTION ASSEMBLY

BACKGROUND OF THE INVENTION

1. Field of the Invention

The invention relates to a fiber optic cable test system, and specifically a connection assembly for a test system.

2. Description of the Related Art

Large-scale fiber optic networks may consist of hundreds or thousands of fiber optic lines which connect central office units of a network provider to remote terminals or remote offices. It is generally necessary to ensure the integrity of the fiber optic cables themselves by checking the transmission over a given distance through automated means.

Currently, fiber optic testing is performed using optical time domain reflectometer (OTDR) test equipment which typically are stand-alone units or provided in rack-mounted hardware. Such units may provide connection for a few fiberoptic cables, but are not suitable for large-scale remote terminal applications wherein a number of cables may be input to a single test unit. In addition, the size of the unit relative to the number of cables for which they are able to support testing is quite large.

In a typical remote office or remote cabinet, a rack space is provided which allows for the easy mounting of many different types of test equipment in a standard format. Typical dimensions of such rack units are about 19" wide by 12" deep. Although the rack unit has a height of several feet, the height of the test equipment mounted in the rack is a consideration in whether to provide the test equipment in the rack space. To date, a high-density switch network and OTDR unit have not been combined in a confined space suitable for use in rack-mount environments of remote terminals or remote offices. One particular problem with such a configuration is providing the facility to connect a large number of optical fibers within a confined space, and still provide room for modular test electronics to be added to the system.

One problem with providing such a high-density connector configuration is the radius of curvature of optical fiber cable. Typically, such radius is approximately 2½", thereby providing a minimum space requirement for all optical fiber connections.

It would be highly desirable to provide a number of connections and test interface electronics in a confined environment.

SUMMARY OF THE INVENTION

The invention, roughly described, comprises a connector assembly for optical fiber cables. The assembly may be used in a remote test unit for an optical fiber network having a number of fiber optic cable connectors coupled to test electronics. The assembly includes a front panel defining a first plane; and a connection panel having a face defining a plane having an angle with respect to the first plane.

In a further aspect, the connection panel includes a first optical fiber connector. The assembly provides an increased density of optical fiber connections in a confined space.

In an additional aspect, the front panel includes a first flange and a second flange defining said first plane, and the connection panel includes a plurality of connector panels, each residing in a plane having an angle with respect to the first plane of at least 30°.

Still further, the connection panel may be coupled to a drawer assembly, the drawer assembly including test electronics and a back plane connector such that the connection panel may be inserted into the remote test unit. The provision of the connector assembly on an angle increases the density of the cable connections which may be provided in a confined space, thereby allowing the use of the drawer and shelf assembly.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION OF THE PREFERRED EMBODIMENTS

One solution to the problem of testing large-scale fiber optic networks is a remote fiber test system which may include a central office operating system, multiple remote units, and direct local control subcomponents.

In the remote fiber test system, the central operating system may be responsible for alarm handling, demand test control, and system administration functions. In one embodiment, the operating system may be comprised of several work stations networked to a database server. The work stations are also connected to network for communication with remote terminal units. The remote terminal units may be self-contained fiber optic test, access, and system control units. In general, surveillance on the optical fibers under test is performed by rapidly scanning each fiber and comparing the scan to a reference. If a problem is detected, a normal scan is initiated to determine if an alarm should be generated to the central operating system. Control for the RTU is provided via the network and dedicated serial links.

Figure 1:
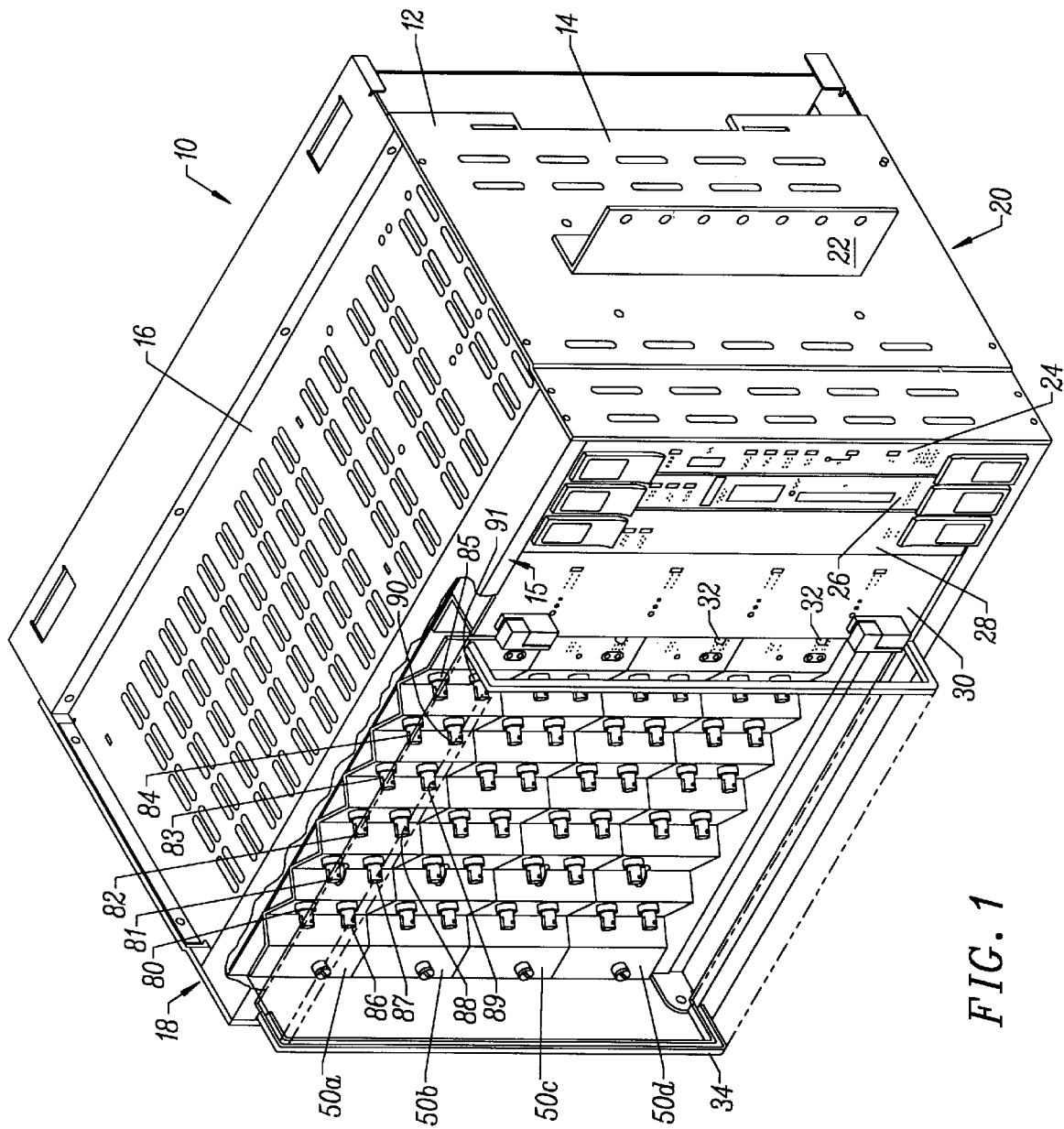
FIG. 1 is a perspective view of a remote test unit suitable for installation in a rack of a remote office or remote terminal.

An exemplary remote test unit is shown in FIG. 1. The remote test unit 10 includes a frame 12 having a first side 14, a top 16, a second side 18, a front side (or face) 15, back side 17, and a bottom portion 20. The frame comprises vented aluminum, stainless steel or other suitable rigid material. L-brackets 22 are provided to mount the remote terminal unit 10 in a frame assembly in a remote office or remote cabinet. Remote terminal unit 10 includes a number of test electronic modules which are responsible for test measurement. These components include a test system controller module 26, a power supply module 24, an optical time domain reflectometer (OTDR) module 28, and an optical test access unit 30. Access unit 30 includes four direct connection optical port connectors 32 for the direct connection of optical fibers under test, along with a backplane connector and a 1×4 switch. The 1×4 switch enables connection of connector assemblies 50a–50d which provide a total of twelve optical connectors per assembly. A cover plate 34, manufactured of clear plastic or other suitable material, may be provided to cover the connector assemblies 50. It should be recognized that while a four connector assemblies 50a–50d are shown in FIG. 1, any number of connector assemblies, including zero, may be utilized. If zero connector assemblies are utilized, the direct connectors 32 allow the system to handle four direct optical fiber connections. It should be readily recognized that a control bus back plain exists between the control unit, power supply, OTDR module, and switch modules. It should be recognized that the power supply 24, system controller 26, OTDR unit 28, and access unit 30 are modular and may be removed from the frame 12 to provide for updating of the electronics or customization of the test unit.

It is generally desirable to provide a minimal amount of physical space in order to allow for advanced testing of the fiber optic test system.

Figure 3:
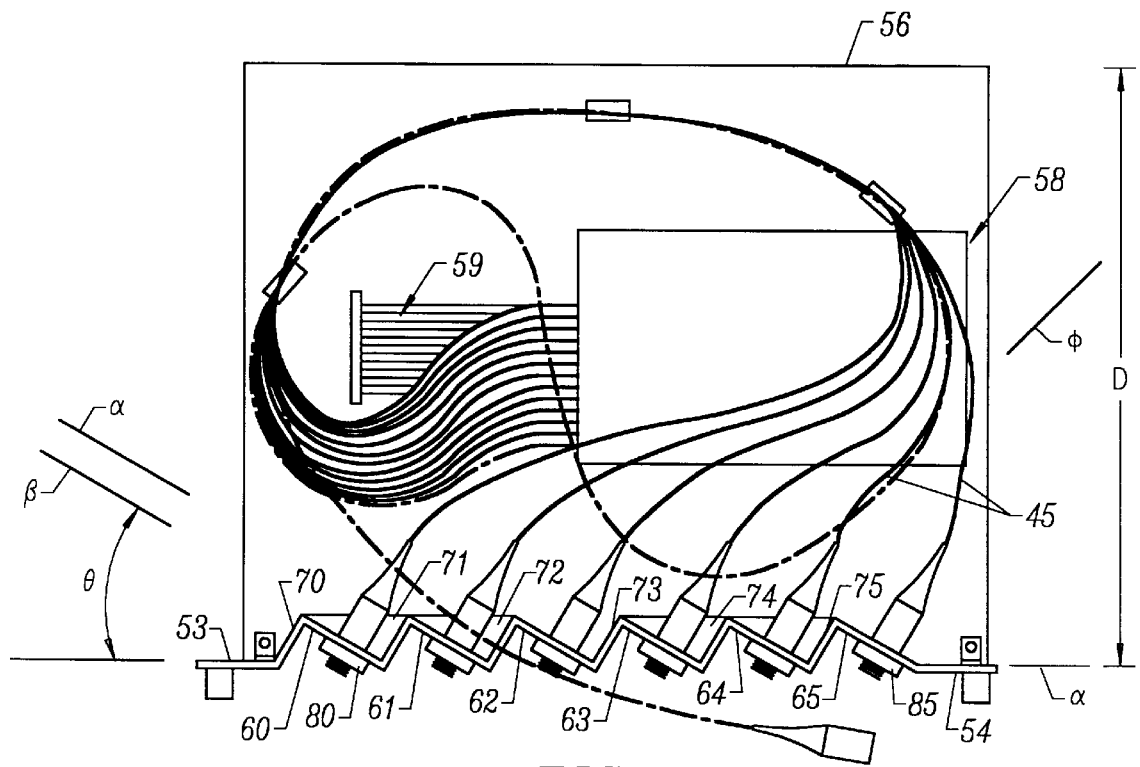
FIG. 3 is a top view of a connector assembly and test electronic shelf in accordance with the present invention.
Figure 2:
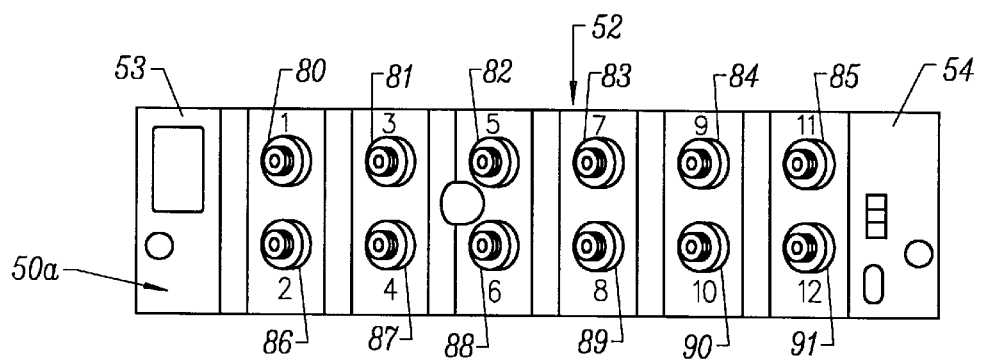
FIG. 2 is a front view of a connector assembly in accordance with the present invention.

FIG. 2 is a front view and FIG. 3 a top view of one connector assembly 50a shown in FIG. 1. As shown in FIG. 2, each connector assembly includes a face plate 52 including a first end flange 53 and a second end flange 54. Flanges 53 and 54 each define a plane α which is parallel to the plane defined by front side 15 of rack assembly 12. Face plate 52 also includes six connector plates 60–65 which each lie in their own plane (demonstrated by planes β and γ) at an angle θ relative to plane α defined by flanges 53 and 54. Each connector plate 60–65 defines its own plane. Connector plate 60 is coupled to flange 53 by a back plate 70. Connection plates 61–65 are likewise connected to previous connector plates by back plates 71–75. Fiber optic connectors 80–91 are mounted in connector plates 60–65, respectively.

Face plate 52 is coupled to a shelf 56 upon which is mounted switch electronics 58 and the back plane connector 59. Shelf 56 is essentially a planar piece of stainless steel which, along with face plate 52, may be inserted into rack assembly 12. Fiber optic cables 45 are provided between connectors 80–91 and switch electronics 58 to couple test cables (not shown) which may be coupled to the connectors 80–91 on assembly 50a.

With respect to the provision of a dense population of cables in a confined space, one limit to this amount of cabling that can be provided is the radius of curvature of fiber optic cable. This radius of curvature is approximately 2.5". This means that the space between the face plate 52 and the cover plate 34, and the depth D which one has to work with is quite limited. By providing the connectors 80–91 on connector plates 60–65, respectively, at an angle θ of approximately 30°, additional room for the radius of curvature of the optical cables is provided within the surface area of shelf 56, thereby allowing the shelf to easily fit in case 12. If the connector plates 60–65 were provided on the same plane a as the flanges 53,54, the radius of curvature of the fiber optic cables would extend the area required for the connector cables 45.

In addition, the angle of the connector plates provides easier access to the base of the connector by moving the cable to the left (in relation to one viewing the front of the test unit). It should be recognized that this principle of the angled connector can be utilized in any number of different density configurations. Connector plates 60–65 may have an angle τ of about 30°, the back plate 70–75 will have a corresponding angle of approximately 60°. It should be further recognized that any number of suitable angles may be utilized within the scope of the present invention. For example, angle τ may be 45° and angle θ may also be 45°. All such embodiments are contemplated as being within the scope of the present invention.

In the remote terminal unit shown in FIG. 1, a 4×48 connector is shown. However, any number of different connector configurations are contemplated within the spirit and scope of the present invention.

The invention may be readily adapted to allow the connector assembly to be utilized with a different type of connector for different applications other than optical fibers wherein the radius of curvature of the connection cables is limited.

Many objects and advantages of the present invention will be apparent to one of average skill in the art. All such features and advantages are contemplated as being within the scope of the invention as defined by the claims and the instant description of the invention.

What is claimed is:

1. A remote test unit assembly for an optical fiber network comprising:
    a housing including a front side defining a first plane;
    a power supply module mounted in the housing;
    a test electronics module mounted in the housing; and
    a connection sub-assembly mounted in the housing and including a front panel having a plurality of connector panels, each connector panel defining a separate plane positioned at an angle with respect to the first plane, a plurality of connectors provided on the sub-assembly, at least one of said connectors mounted on each said connector panel, and a shelf, coupled to the front panel, having switching electronics coupled between the connectors and the test electronics module supported thereon.

2. The remote test unit of claim 1 wherein each connection panel includes at least two optical fiber connectors.

3. The remote test unit of claim 1 wherein the front panel includes a first flange and a second flange lying in said first plane.

4. The remote test unit of claim 1 wherein each separate plane of each said connection panel forms an angle with respect to the first plane of at least 30°.

5. The remote test unit of claim 1 wherein the remote test unit includes a plurality of connector sub-assemblies.

6. The remote test unit of claim 1 wherein the assembly further includes a back plane connector provided on the shelf, and the shelf may be inserted into the remote test unit.

7. A test unit of an optical fiber system having a plurality of optical fiber cables, the test unit comprising:
    a housing including a front side defining a first plane;
    an optical time domain reflectometer module in the housing;
    a power supply module in the housing;
    switching electronics coupled to the optical time domain reflectometer module; and
    a plurality of connector assemblies coupled to the housing, having a front panel which includes a plurality of connector panels, each connector panel defining a separate plane having an angle with respect to the first plane and including at least one cable connector, the connector assembly including a shelf, coupled to the front panel, having said switching electronics mounted thereon.

8. The test unit of claim 7 wherein the front panel includes at least a first flange and a second flange lying in said first plane.

9. The test unit of claim 7 wherein each connector panel includes at least two optical fiber connectors.

10. The test unit of claim 7 wherein the angle is approximately 30°.

11. The test unit of claim 7 wherein the shelf includes a back plane connector.

12. A fiber optic test unit assembly, the unit including a power supply and an optical time domain reflectometer mounted in a housing having a front and back, comprising:

a connector assembly mounted in the housing and including;

a plurality of connection plates having a plurality of face plates each defining a face plane, each of the face planes being parallel to each other and forming an angle with a plane defined by the face of the case, each face plate including at least one fiber optic cable connector;

a shelf, coupled to each connection plate;

switching electronics supported on each said shelf and coupled to the optical time domain reflectometer and the connectors; and a back plane connector mounted on the shelf.

13. The test unit of claim 12 wherein the plane is defined by at least a first flange and a second flange.

14. The test unit of claim 12 wherein each face plate includes at least two optical fiber connectors.

15. The test unit of claim 12 wherein the angle is approximately 30°.

* * * * *